United States Patent [19]

Masters et al.

[11] Patent Number: 5,694,324
[45] Date of Patent: Dec. 2, 1997

[54] SYSTEM AND METHOD FOR MANUFACTURING ARTICLES USING FLUENT MATERIAL DROPLETS

[76] Inventors: William E. Masters; Nathan W. Masters, both of 100 Bentcreek Dr., Easley, S.C. 29642

[21] Appl. No.: 399,208

[22] Filed: Mar. 6, 1995

[51] Int. Cl.[6] .................................................. G06F 19/00
[52] U.S. Cl. .................... 364/468.25; 364/468.26; 156/578
[58] Field of Search ............... 364/468.01, 468.02, 364/468.04, 468.24, 468.25, 468.26, 468.27, 468.28; 118/313–315, 323; 156/155, 578, 218; 427/8, 27, 54.1, 208.2, 424, 265

[56] References Cited

U.S. PATENT DOCUMENTS

| | | | |
|---|---|---|---|
| 4,665,492 | 5/1987 | Masters | 364/468 |
| 4,844,003 | 7/1989 | Slautterback et al. | 118/323 |
| 4,960,619 | 10/1990 | Slautterback et al. | 427/265 |
| 5,134,569 | 7/1992 | Masters | 364/474.24 |
| 5,136,515 | 8/1992 | Helinski | 364/468 |
| 5,257,203 | 10/1993 | Riley et al. | 364/474.05 |
| 5,292,068 | 3/1994 | Raterman et al. | 239/11 |
| 5,340,433 | 8/1994 | Crump | 156/578 |

Primary Examiner—Reba I. Elmore
Assistant Examiner—Thomas E. Brown
Attorney, Agent, or Firm—Robert R. Reed; Cort Flint

[57] ABSTRACT

This invention defines a system and method for manufacturing three-dimensional articles from a design created on a CAD item. The article is made using particle deposition of a fluent material to a build-up on a servo assembly base. The fluent material is deposited in the form of droplets from a dispensing head of a head assembly by moving the assembly up and down in a reciprocating motion according to the three-dimensional design coordinator. A droplet of fluent material forms as the dispensing head moves downward and makes contact with the article being formed, as the head reaches its lowest position of travel. The surface tension and capillarity of the fluent material is used to form the mass and shape of the droplet at the top surface of the article as the dispensing is moved upwards. The size and shape of each droplet may also be controlled by the type of fluent material used as well as its temperature and pressure and the size of the dispensing head orifice.

23 Claims, 4 Drawing Sheets

SYSTEM AND METHOD FOR MANUFACTURING ARTICLES USING FLUENT MATERIAL DROPLETS

BACKGROUND OF THE INVENTION

This invention relates to the automated manufacturing of three dimensional articles that have been defined in a computer data bank of coordinates. In particular, this invention defines a system and method for physically making the articles using particle deposition.

As computer aided design (CAD) systems become more available to help design articles of manufacture the easier it becomes to obtain a data bank of three-dimensional coordinates to describe any article. The CAD software is used on a personal computers and coordinate systems are easy to understand and apply to most products. The U.S. Pat. No. 5,257,203 provides a method for fabrication of one-of-a kind parts of complex geometry. In particular, this patent is directed to a computerized system that manipulates a CAD representation of a three-dimensional object or article such that the presentation substantially duplicates all surfaces of the article. The primary use of the surface representations of this patent is in dental prosthesis. Interior coordinates are also necessary when physically making a three-dimensional article.

The use of CAD to control the operations of a servo type machine for automated computer aided manufacturing (CAM) has also become common in making articles of common as well as complex geometry. Three-axis CAD/CAM milling machines are common in the industry such as the milling machine by Servo Products Co.

The data bank of coordinates defining a three-dimensional article allows the operator of a CAD/CAM system to relate each point within the article to a corresponding X, Y, Z coordinate. One method is disclosed in U. S. Pat. No. 4,665,492 in which particles within the solid article are deposited on a substrate according to the coordinates representing the solid design. Several particle compositions and methods of deposition are described including ejection of plastic material in an ionized atmosphere and the use of slurry materials in a sub-freezing environment. The complexity of the three dimensional representation of an article is overcome by producing a two-dimensional article and adding layer on layer.

The layer by layer building of an article using CAD/CAM system is disclosed in U.S. Pat. No. 5,134,569 where a data file controls servos to index and position a dispensing head. The dispensing head extrudes a continuous strand of fluent material through an orifice. Each layer is treated upon being dispensed to solidify and construct the three-dimensional article. The dispensed material is contacted by a radiation beam at the proper time and location as the fluent material leaves the orifice, to obtain a dimensionally accurate article. Indexing the movement of the servo machine system controls the cross-sectional profile of the article. In the extrusion process a smooth flow of plastic material is necessary and another energy source is required, with the time period between the resin leaving the dispensing head and the time the ultraviolet light contacts it being very critical.

Another method to deposit the fluent material on the three-dimensional article being made is by using particle deposition. In place of an extruded ribbon or other continuous operation, a series of particles are placed adjacent to each other to form a continuous layer and multiple layers are used to make the complete article. In U.S. Pat. No. 5,136,515 a method for depositing particles in two dimensions is disclosed. Particles composed of two or more materials each having different decomposition or adhesion characteristics are used. A first material defines the article being made and a second material furnish support for the first material at the boundaries of the article. The second material is removed when all layers are complete to provide the article in its proper shape. This method and means requires multiple operations plus the problem of separating the supporting material from the article.

While the above methods and systems can provide a three-dimensional article, none have used the physical properties of a particle or droplet to control the deposition of the fluent material used to make the article.

A primary object of the present invention is to automatically manufacture an article which has been designed and described in a computer based data bank of coordinates.

Another object of the present invention is to provide a system and method wherein a three-dimensional article can be made by building up layers of particles or droplets of a fluent material using the forces of surface tension and capillarity.

Yet another important object of the present invention is to provide a smooth working surface for deposition of the fluent material droplets in making the object.

Still another object of this invention is to define a preferred embodiment for changing the fluent material droplets into a solid mass such that support of individual droplets is inherent in the process.

SUMMARY OF THE INVENTION

The above objectives are achieved by the present invention by an automated system and method for manufacturing a three-dimensional article from a computer based representation of said article as defined by three-dimensional coordinates in a predefined spatial environment. The system includes a support base for supporting the article as it is being made. A dispensing head is positioned above the support base and has a dispensing orifice for depositing a fluent material as droplets upon the support base for forming the article. A heater is disposed in a heat transfer relationship with the fluent material for maintaining the material in a fluent state to flow through the dispensing orifice. A servo assembly is operatively associated with the dispensing head and the support base for controlling the relative distance between the dispensing head and the support base in the three-dimensional spatial environment so that the droplets are deposited in relation to the coordinates of the article in the spatial environment. A reciprocating motion mechanism for moving at least one of the dispensing head and support base relative to each other to a dispensing position where the droplets are deposited, whereby the article is formed.

As a further embodiment of this present invention, the reciprocating motion mechanism includes a cam operated assembly. This assembly includes a cam rod connected to the dispensing head and a cam support member which slidably carries the cam rod. A rotating cam device engages the cam rod and a coil spring biases the cam rod against the rotating cam device. A cam shaft is fixed to the cam device and a stepper motor drives the cam shaft to rotate the cam device and reciprocate the dispensing head relative to the support base.

In another embodiment of the present invention, a method for the manufacture of a three-dimensional article on a support base from a computer based data file using a dispensing head is disclosed to achieve the objects of this invention. The method includes the step of initially providing a data file of three-dimensional position coordinates from said data file for defining the article to be manufactured. In a second step, control signals are generated for a machine controller to move and position at least one of the support base and the dispensing head according to the position coordinates using a servo assembly. For a third step, the dispensing head and the support base is supported to control their relative position and to impart a relative reciprocating motion between the dispensing head and the support base. The fourth step includes dispensing the fluent material from an orfice of the dispensing head in the form of a plurality of droplets at a rate determined by a melt index of the fluent material. In a fifth step, droplets of the fluent material are deposited onto the support base, using surface tension of the fluent material, to form the article being manufactured according to the data file of coordinates and in concert with the relative reciprocating motion between the dispensing head and the support base. The final step includes subjecting the droplets, as they are deposited on the article and support base, to a physical change for solidification of the droplets to form a solid article.

DESCRIPTION OF THE DRAWINGS

The construction designed to carry out the invention will hereinafter be described, together with other features.

The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to the automated manufacturing of a three-dimensional article from a computer based representation of the article created in a data file by a CAD system.

Figure 1:
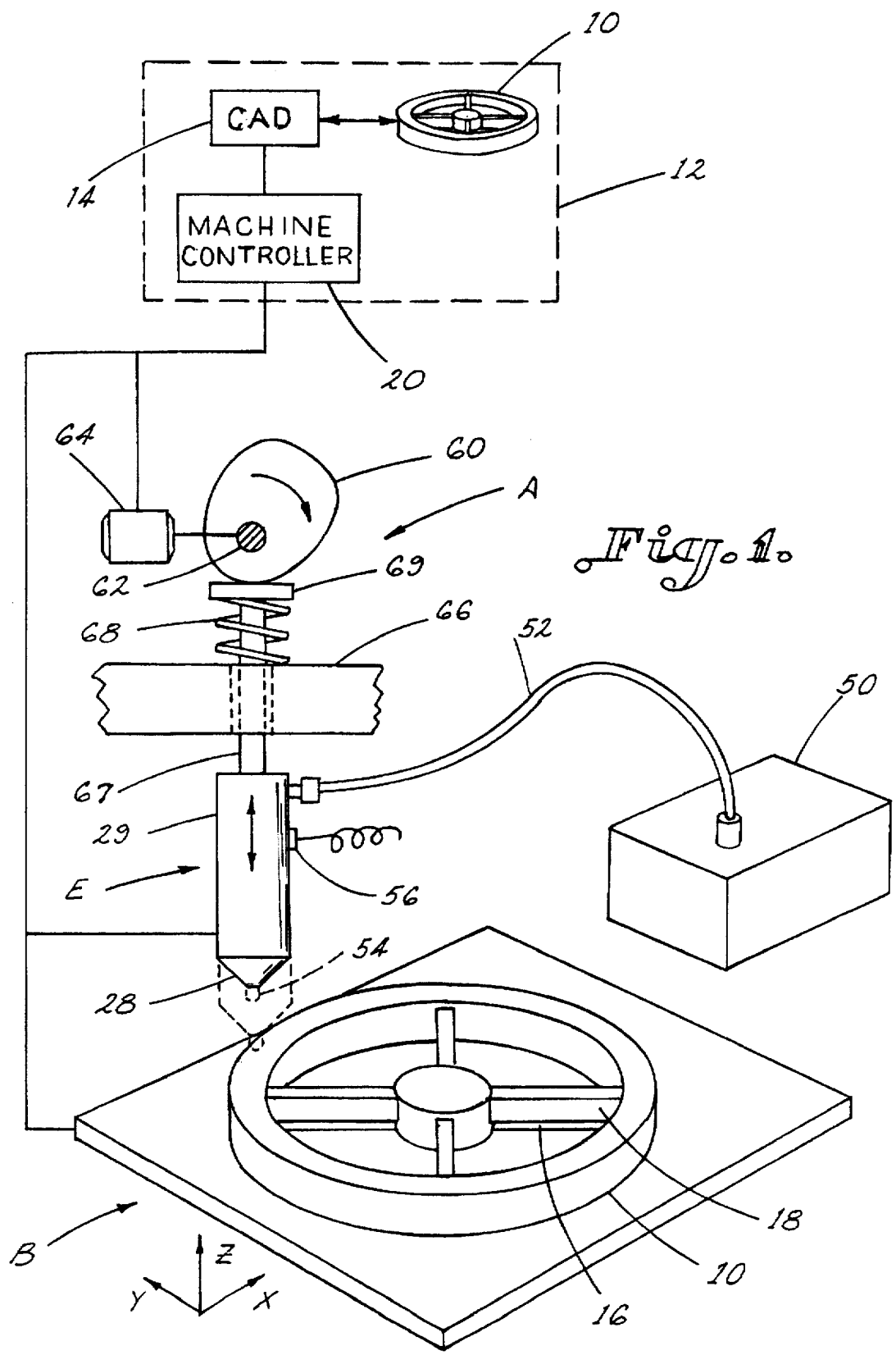
FIG. 1 is a schematic illustration of the computer aided design of a three-dimensional article and the automated reproduction of the physical article on a support base.

Referring now in more detail to the drawings, a three-dimensional article 10 in the form of a spoked wheel has been designed and detailed by a computer aided design (CAD) system 12 in FIG. 1. The CAD system includes a computer aided design machine 14 (CAD machine) which designs article 10 from instructions given by a designer. The CAD machine may be any suitable machine that can be instructed to create, scale, rotate, modify and/or label various elements of the article being designed. A typical computer aided design system 12 is model CADMAN II manufactured by Vector Automation of Baltimore, Md. The CAD machine 14 generates a data file of coordinate information representing three-dimensional coordinates of the CAD. The data file coordinates are transferred and input to a programmed machine controller 20 which controls a servo assembly C having a carriage 30 and supporting a support base B. The X, Y and Z coordinates are input signals to position the support base such that the article 10 can be reproduced in a spatial environment above the support base B.

The servo assembly C imparts relative motion between the carriage 30 and the support base B to achieve the spatial environment necessary to manufacture the article. The carriage may be controlled to move with respect to the servo assembly C and the support base B is also controlled to move with respect to the servo assembly. A combination of movements of the total system gives the spatial environment of the article relative to the support base where it is being formed. A dispensing assembly A, being a part of the carriage 30, can move or be stationary as long as the three-dimensional object can be made by the combination of movements. The preferred movements, and the system to achieve these relative movements, are disclosed in the sections to follow.

The system and method for depositing a fluent material in making the article is also energized and controlled by the machine controller 20. In the preferred system a stepper motor 64 is used to drive a dispensing assembly A in a reciprocating motion up-and-down such that the fluent material is deposited at the correct coordinate location on the device 10 being formed.

Dispensing assembly A includes stepper motor 64 which drives a cam shaft 62 having a cam device 60, illustrated in FIG. 1. The cam device 60 forces a cam rod 67 up-and-down by contact with a cam rod flange 69 as the cam device rotates. The cam rod is supported by a cam support member 66 which maintains the cam rod flange 69 in contact with the cam device. The head assembly E includes the heated barrel 29 that provides a jacket for the dispensing head 28 and helps to maintain the correct temperature and viscosity of the fluent material 54 according to a signal from the machine controller 20. A heater device 56 helps provides the energy to maintain the correct temperature for the head assembly E.

The fluent material 54 is supplied to the head assembly E by a conduit 52 from a material storage source 50. The conduit and the storage source may also be heated to provide an initial conditioning of the fluent material used to make the device 10. The storage source 50 may be operated under a pressure greater than atmospheric to further control the output of fluent material 54. Additional storage sources of other fluent materials may be included within the scope of this invention. These can be connected to the same dispensing assembly A or additional dispensing assemblies may be provided. The deposition of the fluent material 54 on the article 10 being made is discussed in more detail in the paragraphs to follow.

Figure 2:
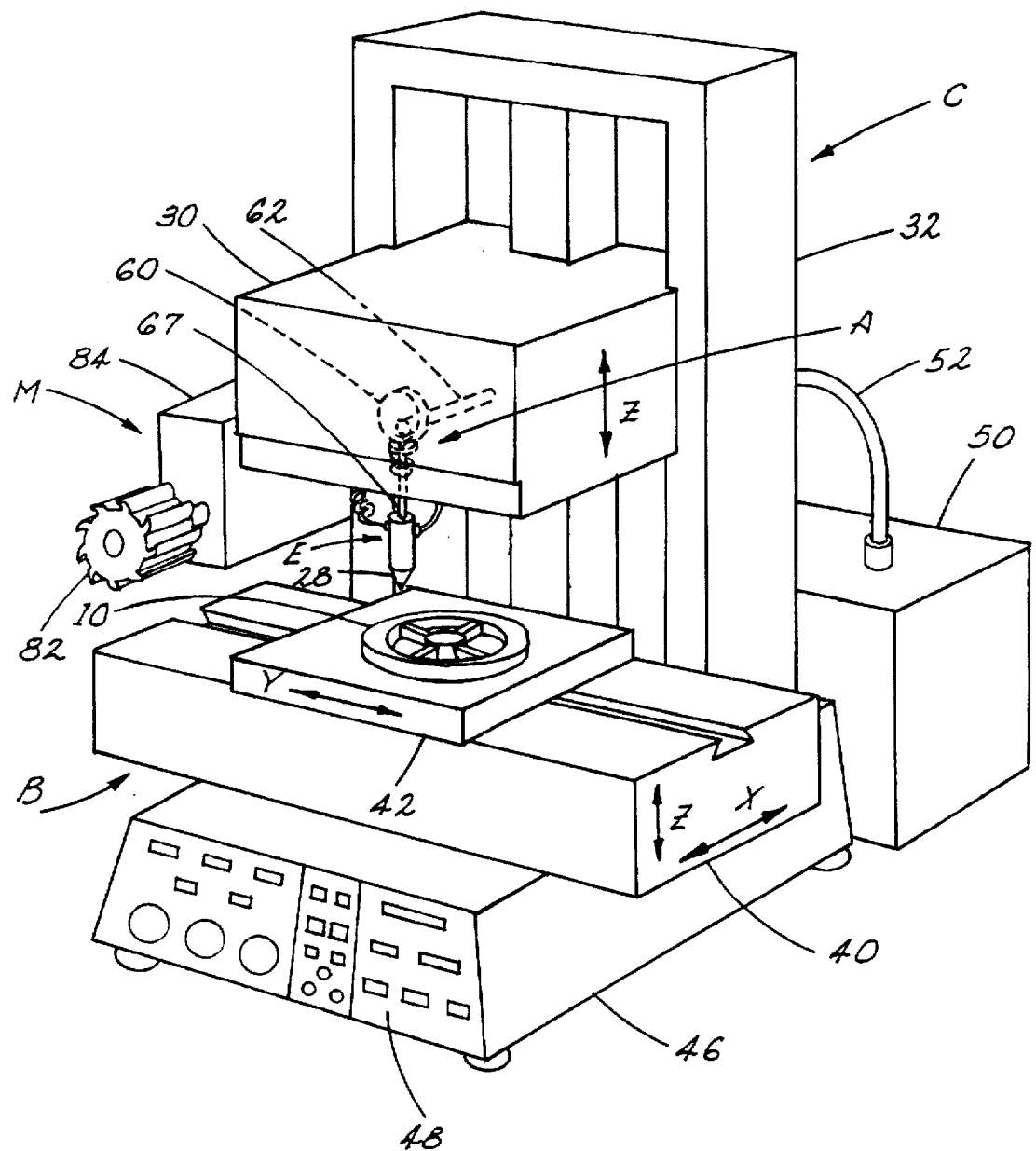
FIG. 2 is a perspective view of a servo assembly and carriage system for automatically manufacturing a three-dimensional article using a CAD generated data file according to the invention.

The location or environment in space where the actual article 10 is being formed from the coordinate data file information is provided by a servo assembly C as illustrated in FIG. 2. The servo assembly has a base housing 46 containing a control panel 48 and a vertical standard 32 that supports the support base B. The vertical standard 32 supports a carriage 30 having the dispensing assembly A partially enclosed therein and extending below the carriage. The support base B has two movable and controllable table components including a first platform 40 which moves in the X and Z directions and a second platform 42 which moves in the Y direction. First platform 40 is supported by the base housing and/or the vertical standard 32 and the second platform 42 is supported by the first platform 40. The carriage 30 can also have a vertical Z direction motion but the preferred Z direction control is by moving the first platform 40. Servo assembly C places the article being formed in the correct position for deposition of additional fluent material from the dispensing head 28 in making the article 10. Servo assemblies or machines are known in the industry and may be any suitable machine, such as that manufactured by Roland, Inc. and sold as Model No. CADD 3. The servo assembly C functions in concert with the CAD system 12 to use the data file of coordinates for making the actual device 10.

Figures 3, 4, 5:
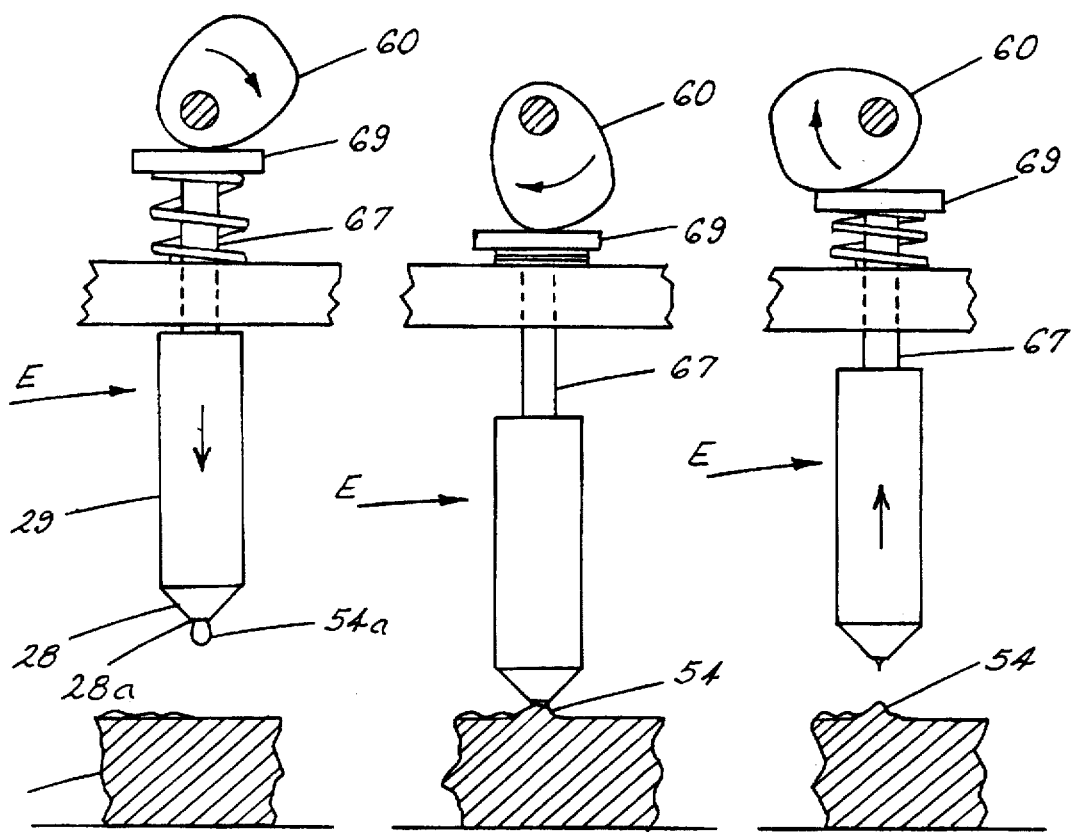
FIG. 3 is a schematic view illustrating a droplet being formed for deposition on the physical article as the dispensing head moves downward according to the invention.
FIG. 4 is a schematic view illustrating the droplet in contact with the physical article being made as the dispensing head reaches its lowest position according to the invention.
FIG. 5 is a schematic view illustrating the droplet having been deposited and in the process of becoming solidified on the physical article according to the invention.

The head assembly E in three different positions is illustrated in FIGS. 3, 4, and 5. The cam device 60 is rotated at first angle to place the cam rod 67 at its most upward position in FIG. 3. The fluent material 54 continues to form a droplet 54a from the head orifice 28a as the dispensing head 28 moves downward to approach the article 10 being made. The fluent material droplet 54b then makes contact with the article and is in the process of being formed and deposited on the article with the cam device 60 at a second angle, as illustrated in FIG. 4. At a third angle of the cam device the dispensing head moves away from the article 10 and the droplet 54c of the fluid material is pulled away from the dispensing head orifice 28a and deposited on the article 10, as illustrated in FIG. 5. The stepper motor 64 sends signals back to the CAD system 12 to tell where the dispensing head 28 is vertically located at any time. This vertical location is coordinated with the X, Y, and Z position of the support base B.

The fluent material 54 may be any suitable compound having a chemical composition which may be transformed from a fluid state to a solid state to form the three-dimensional article 10. Solidification of the layers of the fluent material at the proper time in the proper place with the proper shape is important for the accurate and reliable construction of the three-dimensional article. One thermoplastic material suitable for this invention is a thermoplastic resin manufactured under the designation of Litetak 375 material 54 manufactured by Locklite Corporation of Newington, Conn. This polymer material can be made solid using an energy beam of ultraviolet light. A radiation source is not illustrated in FIG. 2, but may be added as illustrated in U.S. Pat. No. 5,134,569; which is included herein as referenced thereto. Another fluent material 54 includes a compound of two or more chemicals which are mixed internally in the material storage source 50 and are solidified upon dispensing. In a preferred embodiment, the fluent material 54 undergoes a thermophysical change wherein the fluent material is a fluid at a first temperature used at the discharge head nozzle 28a but is lowered in temperature to become a solid when contacting the deposit area on the article. The article is maintained at a second temperature lower than the first temperature. This preferred method may not require a secondary energy source to maintain the temperature difference. Alternate materials used as a fluent material within the scope of this invention include thermoplastic resins, plastics, ceramics, eutectic compositions (fusible alloys), waxes and the like. Some fluent materials, such as fusible alloys of 50 percent bismuth, are used to provide a form for the actual article 10. FIG. 1 shows a form component 16 for supporting the radial portion 18 of the wheel article 10. The low melting point of some fusible alloys allows them to be melted in boiling water and separated from the actual article 10. The use of forming materials added to help shape the actual article is within the scope of his invention. The layers forming the article do not need to be continuous but can have voids.

An essential feature of this invention is the deposition of the droplets of the fluent material 54 from the dispensing head 28 to the article 10 being manufactured. Deposition of the droplets of fluent material also uses the physical properties of surface tension and capillarity of the molecular forces of the molecules of the liquid. Surface tension is due to the cohesive forces between the liquid molecules. An apparent skim forms when the free liquid surface is in contact with air. Surface tension is expressed as the force in the liquid surface normal to a line of unit length. For example, water at 60° F. has a surface tension of 72.3 Dynes per centimeter (0.005 lb. per foot). Capillarity is due to both the cohesive forces between liquid molecules and the adhesive forces of liquid molecules. If a liquid wets a solid there is a greater attraction between the liquid and the solid than between the particles of the liquid and adhesion is stronger than cohesion. The reverse is true if the liquid does not wet the solid.

Figure 7:
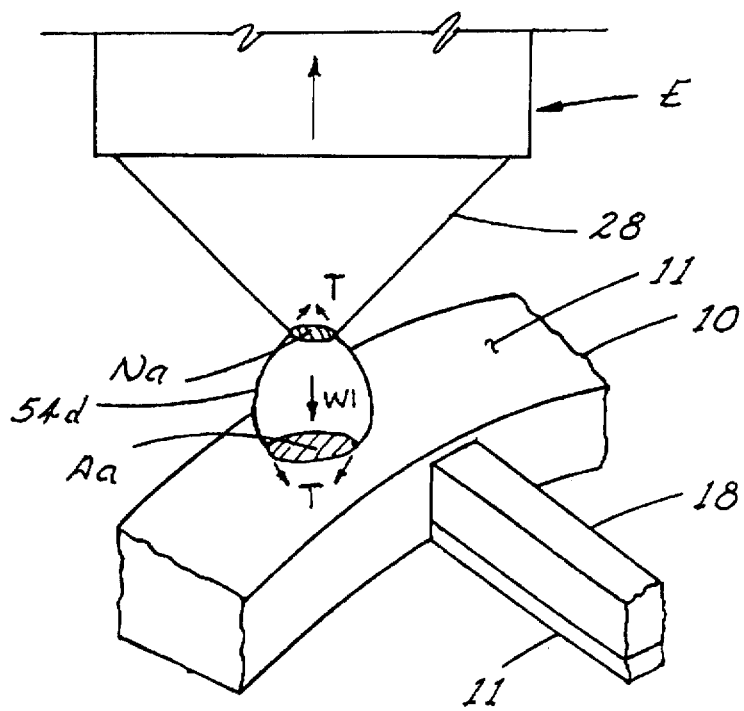
FIG. 7 is a schematic view illustrating the surface tension and capillarity during deposition of a droplet of a fluent material having cohesive forces greater than adhesive forces.

In FIG. 7 a droplet 54d is exaggerated in size to illustrate the surface tension T and the shape of the droplet 54d when the fluent material liquid does not wet the top surface 11 of the article 10. This droplet wets a contact area Aa of the top surface 11 which is less than the maximum cross-sectional area of the droplet at its maximum diameter. The weight W1 of the droplet 54d along with the surface tension T at contact area Aa is adequate to pull the droplet from the dispensing head 28 at the orifice area Na, when the head assembly E moves upward. The shape and mass of the fluent material droplet 54d as it is released from the dispensing head is much more spherical in shape. The top surface for this droplet 54d has cohesive forces between the fluent material molecules greater than the adhesive forces between the fluent material and the solid article 10 being formed. This droplet would project from the top surface 11 when it is solidified at its coordinate location.

Figure 8:
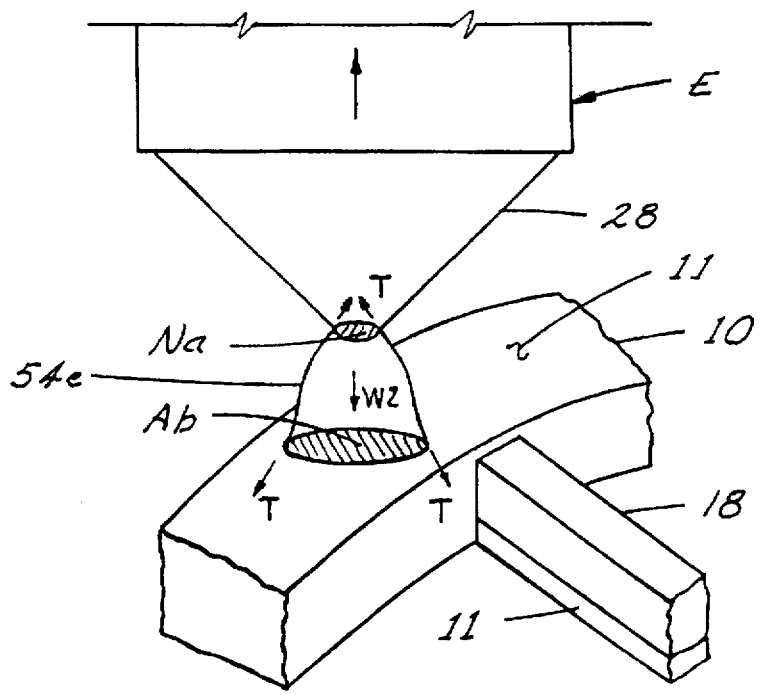
FIG. 8 is a schematic view illustrating the surface tension and capillarity during deposition of a droplet of a fluent material having adhesive forces greater than cohesive forces according to the invention.

In FIG. 8 a droplet 54e is also exaggerated in size to illustrate the surface tension T and the shape of the droplet 54e when the fluent material liquid wets the top surface 11 of the article 10. This droplet wets a contact area Ab of the top surface 11 which is larger than any other cross-sectional area of the droplet. The weight W2 of this droplet 54e along with the surface tension T at contact area Ab provides a downward force to pull this droplet from the dispensing head 28 at the orifice area Na, when the head assembly E moves upward. The shape and mass of this fluent material droplet 54e as it is released from the dispensing head becomes more flat to cover a larger portion of the top surface 11 than the spherical droplet 54d. This flat shape is a result of the adhesive forces between the fluent material and the solid article 10 being larger than the cohesive forces between the fluent material molecules. This droplet 54e would not project as much from the top surface 11 as droplet 54d does when it is solidified at its coordinate location. The coarseness of the coordinate locations indexed in the coordinate data file is modified to account for particle shape and mass, including the relative contact area size from wetting the surface.

The deposition of droplets on the article being made can be adjusted by the selection of a fluent material having a predetermined surface tension and capillarity. The deposit contact area of the droplet on the article is maintained to be larger than the area of the dispensing head orfice such that the total downward force due to surface tension at the top surface of the article is greater than the total upward force due to surface tension at the dispensing head. The surface tension can also be changed for a fluent material by a change in temperature. Surface tension decreases with increasing temperature of the fluent material liquid. Little change is noted with a change in air temperature or pressure around the droplet. Capillarity like surface tension decreases with an increase in temperature. Its temperature variation, however is small and insignificant in most applications.

A control on the amount of fluent material mass deposited on the device per unit time is realized by adjusting the "melt index" of the fluent material. For example, for a thermoplastic resin the melt index is the number of grams at 190° C. that can be forced through a 0.0825 inch (2.0955 millimeter) orifice in 10 minuted by a 2160 gram force. For a thermoplastic resin, a relatively high melt index is achieved and this property makes the thermoplastic resin a desirable fluent material for this invention.

Figure 6:
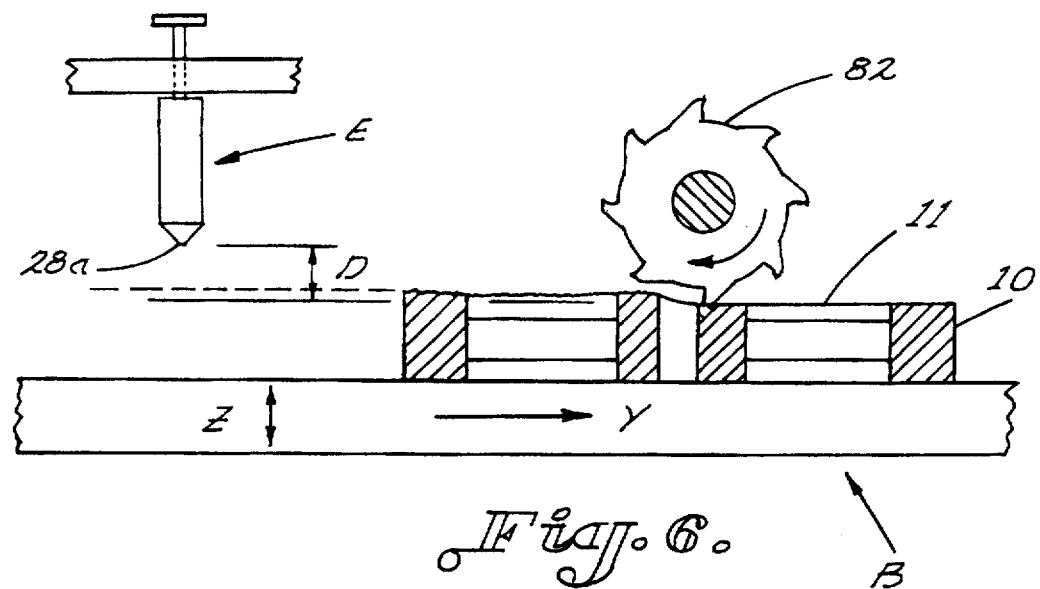
FIG. 6 is a schematic view of the milling machine removing the top surface of the physical article to provide a smooth area for deposition of the droplets according to the invention.

Another parameter in making the article 10 is the magnitude of the Z-direction motion of the reciprocating head assembly E. The amplitude of the Z-direction displacement is adjusted by using different cam devices 60 so that a droplet of the fluent material is properly formed for deposition on the article being made. The article is also positioned at a predetermined distance from the lowest position of the dispensing head orifice 28a. This distance allows the droplet 54a–54e to be pulled from the dispensing head 28 in a manner determined to give the best build for the article. To better achieve this predetermined distance a milling machine M is illustrated in FIGS. 2 and 6. A cutter head 82 is driven by a milling base portion 84 to establish a working distance D at periodic intervals during the building of the article 10. The base B moves the article 10 in the Y-direction and the cutter head 82 establishes a new smoother surface, such that the deposition of fluid material can continue.

There are a number of parameters which have been described to make the system and method of this invention achieve the objects herein stated. Adjustments in the fluent material used including its temperature, surface tension, capillarity and melt index as well as the spacing of the top surface of the article being formed and the temperature of the article and the supporting base B can be made to achieve a three-dimensional article of manufacture from a CAD system.

While a preferred embodiment of the invention has been described using specific terms, such description is for illustrative purposes only, and it is to be understood that changes and variations may be made without departing from the spirit or scope of the following claims.

What is claimed is:

1. An automated system for manufacturing a three-dimensional article from a computer based representation of said article, as defined by three-dimensional coordinates in a predefined spatial environment, said system comprising:

a support base movable for supporting said article as it is being made;

a dispensing head positioned above said support base and having a dispensing orifice for depositing a fluent material as droplets upon said support base for forming said article;

a heater disposed in heat transfer relation with said fluent material for maintaining said material in a fluent state to flow through said dispensing orifice;

a servo assembly to operatively associated with said dispensing head and said support base for controlling the relative positions of said dispensing head and support base in said three-dimensional spacial environment so that said droplets are deposited in relation to said coordinates of said article in said spacial environment;

a reciprocating motion mechanism for moving one of said dispensing head and support base relative to each other to a dispensing position where said droplets are deposited, whereby said article is formed; and said dispersing head and support base having a plurality of relative vertical positions during formation of said article which includes first relative vertical positions at which said droplets begin to form from said dispensing orifices and second relative vertical positions in which said dispensing head and support base are closer together so that said droplets are deposited by surface tension upon said article being formed.

2. The system set forth in claim 1, wherein said reciprocating motion mechanism includes a cam operated assembly which comprises:

a cam rod connected to said dispensing head;

a cam support member which slidably carries said cam rod;

a rotating cam device for engaging said cam rod;

a coil spring to bias said cam rod against said rotating cam device;

a cam shaft affixed to said cam device; and a stepper motor for driving said cam shaft to rotate said cam device and reciprocate said dispensing head relative to said support base.

3. The system set forth in claim 1, wherein said support base includes:

a first platform movable by said servo assembly; and a second platform supported by said first platform and positioned with respect to said first platform.

4. The system set forth in claim 1, wherein said dispensing head is at least partially encased by a heated barrel.

5. The system set forth in claim 1, wherein a heated conduit is connected to said dispensing head for supplying said fluent material from a material source, said material source being operated under a predetermined pressure greater than atmospheric and may be heated.

6. The system set forth in claim 1, wherein said orifice of the dispensing head has a diameter less than another diameter of the area formed by said droplets of said fluent material as they become deposited on said article being formed.

7. The system set forth in claim 1, wherein said controlled spatial environment is realized by a machine controller to position and index said support base in at least two dimensions using said servo assembly.

8. The system set forth in claim 7, wherein said machine controller further positions and indexes said support base in a third dimension using said servo assembly.

9. The system set forth in claim 1, wherein said system further includes a data file of three-dimensional coordinates corresponding to said three-dimensional article for positioning said support base using said servo assembly.

10. The system set forth in claim 1, wherein said orfice of the dispensing head deposits said droplets of the fluent material at a rate determined by a melt index of said material.

11. The system set forth in claim 10, wherein each droplet is being formed below the orfice as said dispensing head approaches the support base and becomes fully formed as the dispensing head is at its closest position relative to the base support where said droplet is in contact with said article being made, said droplet is pulled from the orfice and is deposited to form said article as said dispensing head moves away from said base support.

12. The system set forth in claim 10, wherein said each droplet comprises:
 a surface tension and a capillarity controlled by a first temperature of said fluent material; and
 a mass controlled by said melt index, wherein said droplet is pulled and dropped from said orfice of the dispensing head and is made to solidify upon said article at a second temperature.

13. The system set forth in claim 1, wherein said system further includes a milling machine to periodically machine a relatively smooth top surface on said three-dimensional article being manufactured such that said orfice of the dispensing head can be positioned a predetermined distance above said article during deposition of said fluent material.

14. The system set forth in claim 13, wherein said milling machine further includes a base operator portion and a cutter.

15. A method for the manufacture of a three-dimensional article on a support base from a computer based data file using a dispensing head including the steps of:
 a) providing a system of three-dimensional position coordinates from said data file for defining said article to be manufactured;
 b) generating control signals for a machine controller to move and position at least one of said support base and said dispensing head according to said position coordinates using a servo assembly;
 c) supporting said dispensing head and said support base to control their relative position and to impart a relative reciprocating motion between said dispensing head and said support base;
 d) dispensing a fluent material from an orifice of said dispensing head in the form of a plurality of droplets at a rate determined by a melt index of said material;
 e) reciprocating at least one of said dispensing head and support base between a plurality of relative vertical positions to deposit said droplets of said fluent material onto said support base and article by surface tension to form said article being manufactured according to said position coordinates and in concert with said relative reciprocating motion between said dispensing head and said support base; and
 f) subjecting said droplets to a physical change for solidification of said droplets as they are deposited to form a solid article.

16. The method set forth in claim 15, wherein the act of reciprocating said dispensing head includes the steps of;
 attaching said dispensing head to a cam rod;
 supporting said cam rod by a cam support member to allow said cam rod to slide with respect to said support member;
 biasing said cam rod against a cam device using a coil spring;
 rotating said cam device by an attached cam rod driven by a stepper motor.

17. The method set forth in claim 15, wherein said method further includes the steps of:
 positioning a first platform of said support base in accordance with said data file of coordinates; and
 positioning a second platform of said support base in accordance with said data file of coordinates, said first platform being supported by said servo assembly and said second platform being supported by said first platform.

18. The method set forth in claim 15, wherein the dispensing step further includes:
 storing the fluent material in a heated material storage container operated under a predetermined pressure greater than atmospheric;
 delivering said fluent material to said dispensing head through a heated conduit from said storage container;
 heating the dispensing head using a heated barrel to at least partially encase said dispensing head and heat said fluent material to achieve said melt index.

19. The method set forth in claim 15, wherein the step of depositing said droplets from said orfice further includes the steps of:
 moving the dispensing head to approach the support base as a respective droplet is being formed;
 stopping the dispensing head at a predetermined distance from the support base when the droplet is fully formed and in contact with a contact area on the article being formed at the desired coordinate; and
 moving the dispensing head away from the support base as the droplet is pulled from the orfice of the dispensing head by surface tension of the fluent material and deposits itself on the article being formed.

20. The method set forth in claim 19, including the step of controlling the surface tension of said droplet by controlling a first temperature of said fluent material such that said droplet is pulled and dropped from said dispensing head and is deposited on said article and made to solidify upon said article due to a physical change in the properties of the deposited fluent material, said article having a second temperature when being formed.

21. The method set forth in claim 15, wherein said method further includes the step of milling a relatively smooth top surface on said article with a milling machine to condition said three-dimensional article being manufactured such that said dispensing head can be positioned a predetermined distance above said article during deposition of said droplets.

22. The method set forth in claim 21, wherein said milling step further includes the step of updating the date file of coordinates to account for the removal of material during said milling step.

23. The method set forth in claim 15, wherein the step of providing position coordinates includes the step of converting the data file from a CAD machine to a data file having the three-dimensional coordinates required for said servo assembly and manufacturing method.

* * * * *